Nov. 6, 1956 R. L. BRIGGS 2,769,927

APPARATUS FOR GENERATING A PULSE VOLTAGE AND BIAS

Filed Oct. 10, 1951 3 Sheets-Sheet 1

Rufus L. Briggs
INVENTOR.

BY

Wooster & Davis
Attys.

Nov. 6, 1956 R. L. BRIGGS 2,769,927

APPARATUS FOR GENERATING A PULSE VOLTAGE AND BIAS

Filed Oct. 10, 1951 3 Sheets-Sheet 2

Rufus L Briggs
INVENTOR.

BY

Wooster & Davis
Attys.

Nov. 6, 1956 R. L. BRIGGS 2,769,927

APPARATUS FOR GENERATING A PULSE VOLTAGE AND BIAS

Filed Oct. 10, 1951

3 Sheets-Sheet 3

Rufus L. Briggs
INVENTOR.

BY
Wooster & Davis
Attys.

United States Patent Office 2,769,927

Patented Nov. 6, 1956

2,769,927

APPARATUS FOR GENERATING A PULSE VOLTAGE AND BIAS

Rufus L. Briggs, Melrose, Mass., assignor to Ira A. Campbell, New York, N. Y.

Application October 10, 1951, Serial No. 250,763

7 Claims. (Cl. 307—106)

This invention relates to electronic circuits where a voltage pulse is required to perform some desired function, and where a voltage pulse in conjunction with a substantially unvarying voltage is required to perform some desired function.

More particularly, this invention relates to a method of producing a voltage pulse and at the same time producing a substantially unvarying voltage which may be used in electronic circuiting independent of or in conjunction with the voltage pulse, means of varying the peak magnitude of the voltage pulse, and means of varying the time phase relationship of the voltage pulse with respect to some reference voltage.

An object of this invention is to provide a new method of producing a voltage pulse, and particularly a method of producing a voltage pulse in conjunction with a substantially unvarying voltage.

Another object of this invention is to provide a simplification of the circuiting now required to obtain a control voltage consisting essentially of a substantially unvarying voltage on which is superimposed a voltage pulse.

Another obect of this invention is to provide a reduction in the number of and simplification of the electronic components now required to obtain a control voltage consisting essentially of a voltage pulse superimposed on a substantially unvarying voltage.

Another object of this invention is to provide a voltage pulse of novel characteristics particularly qualified for use in electronic control systems.

Another object of this invention is to provide a voltage pulse capable of being phased in its time relationship with some reference voltage by a new and novel method.

Another object of this invention is to provide a new method of varying the peak magnitude of the voltage pulse.

In the drawings—

For convenience in referring to the figures the same reference numerals have been used to designate similar or identical parts.

In electronic circuiting a voltage pulse is used to initiate or trigger the operation of other circuits or circuit elements. This pulse usually consists of a sudden very rapid change of voltage in a circuit from one level of intensity to a different level, the maintenance of this voltage at the new level for a short period of time, and the rapid return of this voltage to the initial level. In electronic control a suitable pulse is one with a rate of change of the pulse voltage as great as possible, and with the change persisting for a period which may be as long as 500 micro-seconds.

Up to the present time voltage pulses have been produced by several methods, all of which involve either complication of circuiting or specially constructed components. Among these methods is the peaking transformer of unusual design as described in the General Electric Review for June 1943, volume 37, Number 6, at pages 288–295.

The present invention uses standard components combined in a simple circuit, and produces a pulse voltage of novel and useful characteristics as well as unvarying D. C. voltage which may be employed for bias or other control purposes.

Figure 1:
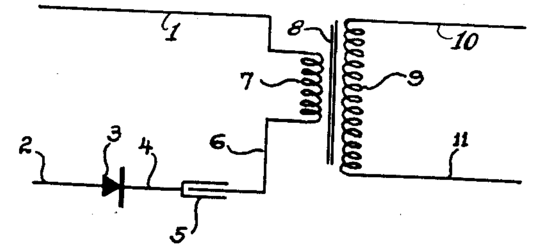
Figure 1 is a circuit diagram of the embodiment of the invention to obtain a voltage pulse useful for electronic control purposes.

Referring to Figure 1, the circuit here disclosed includes a rectifier 3 connected by lead 4 to one side of a capacitor 5. The other side of capacitor 5 is connected by lead 6 to the primary 7 of a transformer. Rectifier 3 may be of any suitable halfwave type capable of rectifying the charging current flowing into the capacitor 5 and operating without breakdown under the inverse voltages which appear in the circuit. Capacitor 5 is preferable of a high loss low efficiency type, since it is desirable that it lose some of its charge during periods when rectifier 3 is not conducting. The transformer can be of the current transformer type, having a primary 7 wound for operation at a suitable low voltage and current requirements, a core 8, and a secondary 9 having many times as many turns as has primary 7. The series connected rectifier 3, capacitor 5, and primary 7 of the transformer are connected by leads 1 and 2 to a suitable source of A. C. power.

When lead 2 first becomes positive with respect to lead 1 during the alternation of the source voltage and following the establishment of the complete connection as described above, current will flow from lead 2, through rectifier 3, capacitor 5, primary 7, and lead 1 back to the source. This current will charge capacitor 5 to a maximum voltage equal to the peak voltage of the A. C. source less any voltage drop existing in the circuit.

When lead 2 becomes negative with respect to lead 1 no current flow can occur in the circuit since such flow is restrained by the action of rectifier 3. During this period of source voltage reversal some of the charge stored in capacitor 5 is lost due to internal leakage, and the voltage across the terminals of capacitor 5 drops to a few volts less than its previous maximum voltage.

When lead 2 again becomes positive with respect to lead 1 no current will flow through rectifier 3 until the source voltage rises to a value greater than that appearing across the capacitor, which voltage is in opposition to the source voltage by reason of the rectifying action. At this point current will flow through rectifier 3 and recharge capacitor 5 to its previous level. This current flow is relatively low in magnitude, short in time of persistence, and occurs in all subsequent variations of the source voltage at exactly the same point in the voltage alternation.

The flow of the recharging current through the primary 7 of the transformer causes a rapid flux change in core 8, and generates a pulse of voltage of relatively high magnitude in the secondary 9 of the transformer. Leads 10 and 11 connect the secondary 9 of the transformer to some control point where the pulse is to be employed.

It should be noted in Figure 1 that there is no provision for altering the time relationship between the generation of the pulse in the secondary 9 of the transformer and some reference point in the voltage alternation of the source.

Figures 2, 3:
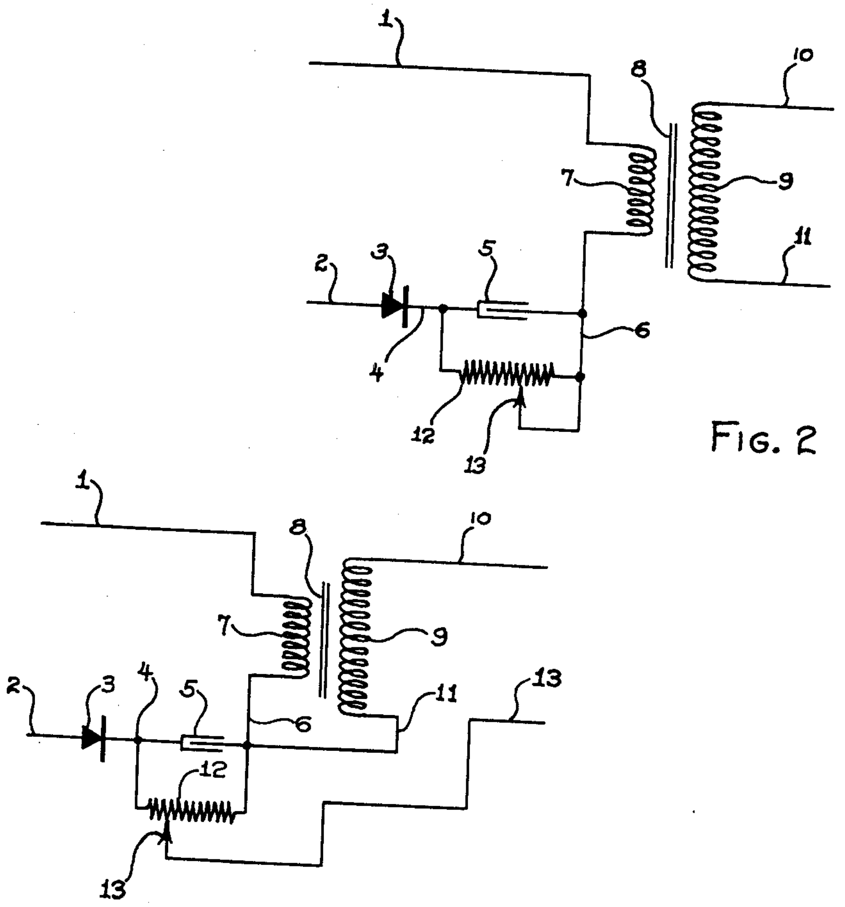
Figure 2 illustrates another embodiment of the invention whereby a variation in the magnitude of the pulse is obtained, or whereby a change in the time-phase relationship of the voltage pulse with respect to some reference voltage is obtained.
Figure 3 is a circuit diagram of the embodiment of the present invention to obtain a voltage pulse superimposed on a substantially unvarying voltage for electronic control purposes.

Figure 2 shows a circuit providing means for adjusting the discharge rate of capacitor 5 during the period of no current flow to charge said capacitor. The operation of this circuit is in all respects identical with the operation of the circuit shown in Figure 1, except for the addition of the variable resistor 12 which is connected in parallel across capacitor 5 to provide an external means of providing a loss of charge in capacitor 5. Since the loss of charge of capacitor 5 is now provided externally said capacitor may now be of the low loss high efficiency type. Resistor 12 is connected to leads 4 and 6, and is provided with a shunting slider 13 which shorts out a selected portion of resistor 12, thus providing means of varying the magnitude of the resistance of resistor 12 from its rated maximum value to zero.

As the resistance of resistor 12 is decreased, the rate of discharge of capacitor 5 is increased during periods of no current flow through the circuit. It occurs, therefore, that the recharging current will flow at some different value of the source voltage for each adjustment of the slider 13 on resistor 12. This will in turn lead to a means of varying the time relationship between some reference point on the source voltage variation and the appearance of the voltage pulse in the secondary of the transformer.

In Figure 3 the circuit is given whereby a control voltage is generated which consists of a pulse voltage and a substantially unvarying voltage in combination. The transformer primary 7, the capacitor 5, and the rectifier 3 are connected as in Figure 2, with resistor 12 connected in parallel with capacitor 5. Reference is made, in the description of the operation of this circuit, to Figure 4 which is a graphic representation of the voltages and current in the circuit of Figure 3 showing their variation with time.

The A. C. voltage $V_L$, plotted on the time axis OO in Figure 4, exists across the leads 1 and 2. The voltage $V_c$, plotted on the time axis O'O', is the voltage across the capacitor 5. Let us assume that at the instant of time $t_0$ the voltage $V_L$ is passing through zero in a direction to make lead 2 positive with respect to lead 1. This voltage direction is favorable for conduction of current through the rectifier 3. Voltage $V_c$ exists, however, across the capacitor and is in opposition to $V_L$. As $V_L$ increases in magnitude a time $t_1$ will be reached when $V_L$ starts to become greater in magnitude than $V_c$, and a current $I_p$, plotted on time axis OO, will flow. This current replaces the charge lost from capacitor 5 and raises the terminal voltage across the capacitor to be substantially equal to the voltage of $V_L$ less any voltage drop which may occur in the circuit.

At time $t_2$ $V_L$ has reached its maximum value, and so also has $V_c$. $I_p$ hence has decreased to zero. From time $t_2$ to $t_3$ the voltage around the series circuit consisting of the power source, the transformer primary 7, the capacitor 5, and the rectifier 3 is in such a direction as to attempt to circulate a current in the opposite direction to $I_p$. Such a current is blocked by the rectifier action of rectifier 3.

From time $t_2$ to $t_3$, also, the charge in capacitor 5 is slowly dissipated in resistor 12, and the terminal voltage $V_c$ across capacitor 5 slowly decreases. At time $t_3$ the recharging action again takes place, and current $I_p$ flows until time $t_4$. This sequence of actions continues as long as voltage $V_L$ is applied to leads 1 and 2.

Figure 4:
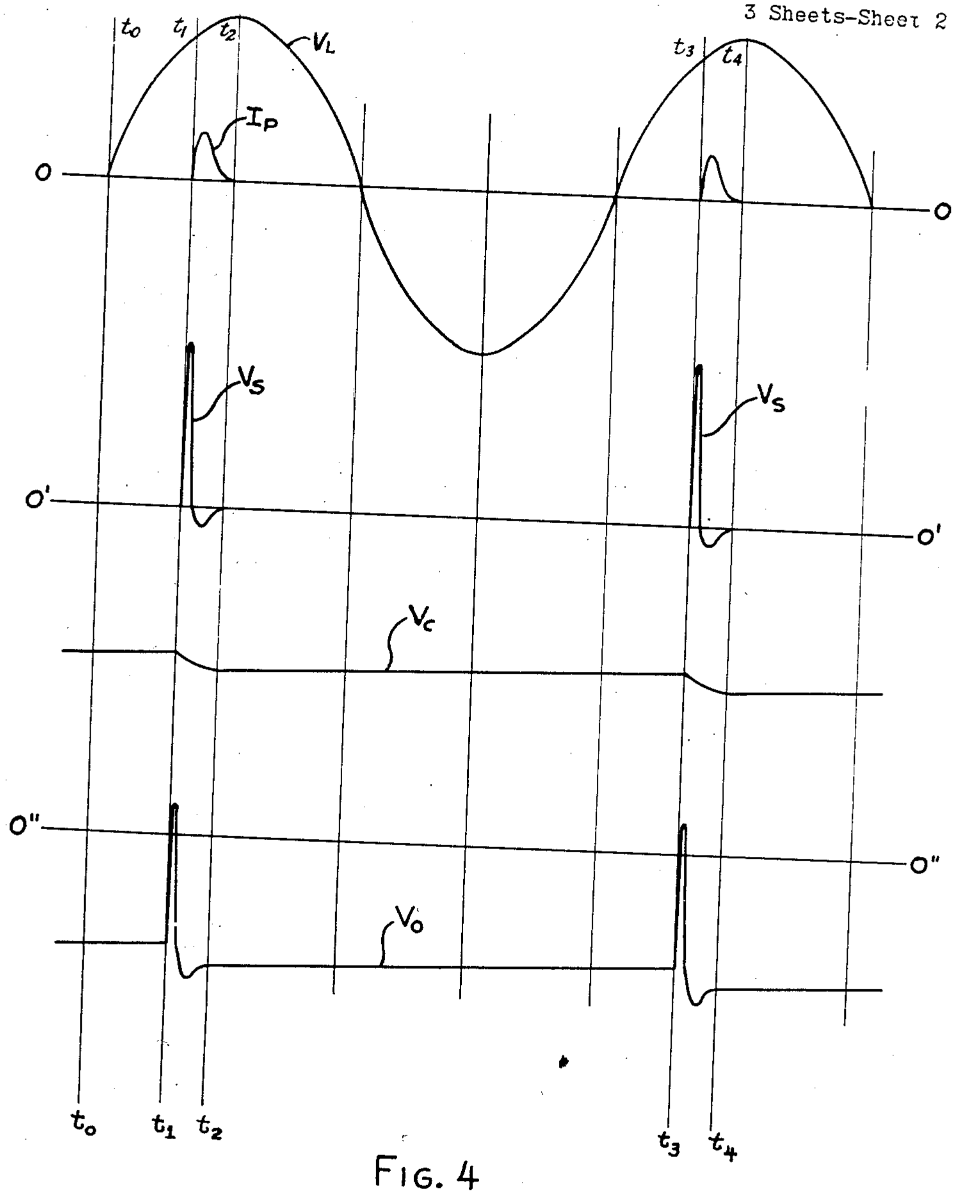
Figure 4 is a coordinated graph illustrating the voltage and current changes with respect to a time axis which appear in the operation of the circuit given in Figure 3.

When current $I_p$ flows through the transformer primary 7 a voltage $V_s$, plotted on time axis O'O' in Figure 4, is generated in the transformer secondary 9 and appears at the secondary terminal leads 10 and 11. This voltage is the pulse voltage. The voltage $V_c$ is, in comparison with $V_s$, substantially uniform and since it appears across the capacitor 5 it also appears across the parallel connected resistor 12. By use of slider 13 on resistor 12 it is possible to obtain between slider 13 and one end of resistor 12, which we will select as lead 6, a voltage which is any selected portion of the voltage $V_c$.

If lead 11 is now connected to lead 6 then the voltage between lead 10 and slider 13 will be the sum at any instant of the pulse voltage $V_s$ and some selected fraction of $V_c$. Such a voltage is shown as $V_o$ in Figure 4, plotted on the time axis O''O''. As here shown we note that lead 10 is negative with respect to slider 13 except at the pulse period when it rapidly becomes positive for a brief time period.

It should be noted that the circuit of Figure 3 produces a pulse for each full cycle of the A. C. supply voltage $V_L$.

Figure 5:
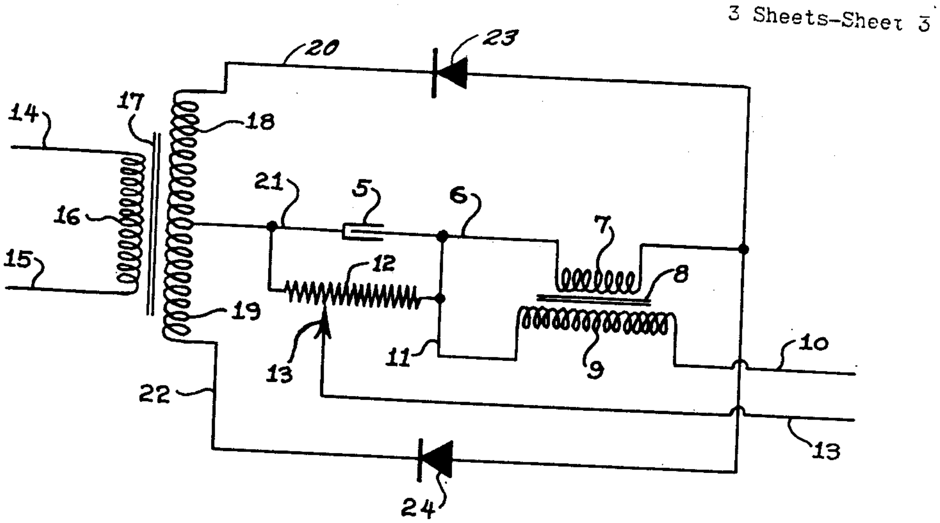
Figure 5 is a circuit diagram illustrating an alternative embodiment of the invention.

Referring to Figure 5 a circuit is shown wherein a pulse is obtained for each half cycle of the A. C. supply voltage $V_L$. It differs from the circuit given in Figure 3 only in that the capacitor 5 is charged from a full wave rectifier circuit instead of a half wave.

Figure 6:
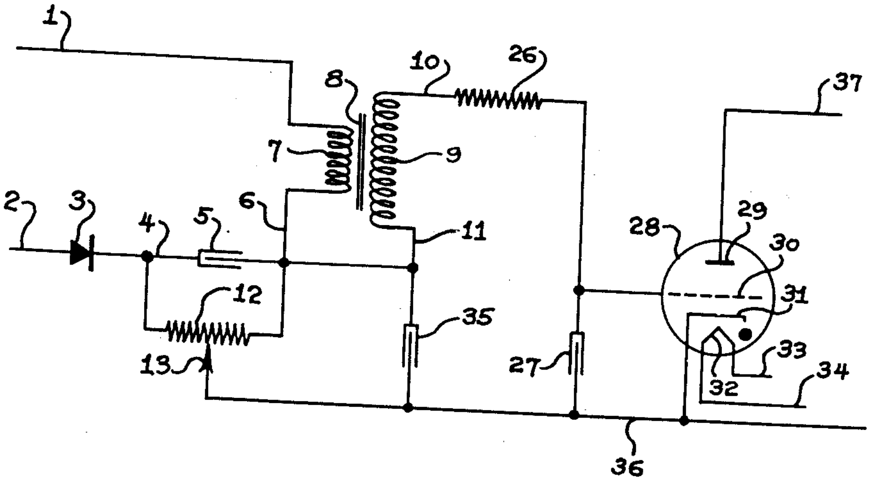
Figure 6 is a circuit diagram illustrating an application of the invention to control the firing of a Thyratron tube.

Figure 6 illustrates an application of my invention to control the firing of a grid controlled gas or mercury filled arc discharge tube known to the art as a thyratron. Thyratron tube 28 is employed as a switch in a load circuit energized from some A. C. souce. Details of this load circuit are not shown as they are well known to those skilled in the art and do not enter into the application of the invention. The grid control circuit of the thyratron is identical with that shown in Figure 3, with the addition of resistor 26, and capacitors 27 and 35. Resistor 26 is a grid resistor whose function it is to limit the grid current when grid 30 is positive with respect to cathode 31. Capacitor 27 is the grid capacitor whose function it is to by-pass any transient high frequency voltages which might enter the circuit. Capacitor 35 is a filter capacitor whose function it is to smooth out any slight fluctuations in that portion of the substantially unvarying D. C. voltage $V_c$ which appears across lead 6 and slider 13.

As previously described we see that this control circuit delivers a voltage $V_o$, shown in Figure 4, between lead 10 and slider 13. This voltage appears across the grid 30 and cathode 31 of tube 28. When lead 10 is negative with respect to slider 13 the grid 30 of tube 28 is held negative with respect to cathode 31 and tube 28 cannot fire. When the pulse occurs in the voltage $V_o$ the grid 30 is elevated to a voltage above the so-called critical or firing voltage, allowing tube 28 to fire.

If the A. C. voltage applied to leads 1 and 2 be properly phased with respect to the A. C. voltage applied to the load and Thyratron it is possible to fire tube 28 at any point in the voltage variation applied to the anode 29, so that approximately full half cycles of conduction or any portion thereof may be obtained. The cathode heater 32 is connected by leads 33 and 34 to a suitable power supply.

Such a control circuit as here described applied to the control of the firing of a thyratron can be constructed of the following components: Rectifier 3—selenium, Cat. No. 1003A, Federal Telephone and Radio Corp.; Capacitor 5—twin section electrolytic, Cat. No. BRD–8D45, Cornell-Dubilier; Capacitor 35—part of capacitor 5; Transformer—filament, Cat. P–4026, Stancor; Resistor 12—slidewire, Cat. 1040, Ohmite; Resistor 26—2 watt 50,000 ohm carbon; Capacitor 27—0.0005 mica, 2000 v. test. In this control circuit the A. C. voltage $V_L$ was 115 v. 50 cycles.

It will be understood by those well skilled in the art that many variations and modifications of my invention are possible. In Fig. 1, for example, a mechanical or electronic switch may be substituted for rectifier 3 and leads 1 and 2 connected to a source of D. C. power. I do not desire, therefore, to be restricted to the particular details and circuits shown and described herein, but only within the scope of the appended claims.

What I claim is:

1. The combination of a transformer having a high ratio of turns between the primary and secondary, a capacitor whose charging current is capable of sufficiently exciting the transformer, and a resistor, the primary of the transformer and the capacitor being connected in series across a rectified A. C. power source, said resistor being connected to said capacitor to discharge this capacitor, and the secondary of the transformer being in an output circuit, in which the flow of a charging current from said source to said capacitor through the said primary to recharge the capacitor by replacing the charge lost through the resistor will generate a usable voltage pulse in the secondary of the transformer.

2. The combination of a transformer having a high ratio of turns between the primary and secondary, a capacitor whose charging current is capable of sufficiently exciting the transformer, and an adjustable resistor, the primary of the transformer and the capacitor being connected in series across a rectified A. C. power source, said adjustable resistor being connected to said capacitor to discharge said capacitor, and the secondary of the transformer being in an output circuit, in which the flow of a charging current from said source to said capacitor occurring at a time period in reference to the time of zero voltage in a phase of said A. C. power source produces a voltage in the output circuit consisting of a voltage pulse superimposed on the voltage in whole or in part appearing across the capacitor, said time period being adjusted by means of said adjustable resistor, and said output circuit voltage being obtained from one side of said transformer secondary and one side of said capacitor wherein the other side of said secondary and said capacitor are connected together.

3. The combination of a transformer having a high ratio of turns between the primary and secondary, a capacitor whose charging current is capable of sufficiently exciting the transformer, and a switch, the primary of the transformer, the capacitor and the switch being connected in series across a source of D. C. power, and the secondary of the transformer being in an output circuit, in which reclosing of the switch after an open period causes a current flow through the primary to recharge the capacitor by replacing the charge lost during the open period, and said current flow generates a usable voltage pulse in the secondary.

4. The combination of a transformer having a high ratio of turns between the primary and secondary, a capacitor whose charging current is capable of sufficiently exciting the transformer, and a half wave rectifier, the primary of the transformer, the capacitor and the rectifier being connected in series across an alternating current source of power, and the secondary of the transformer being in an output circuit, in which the current flow from said A. C. source through the said rectifier recharging said capacitor by replacing the charge lost during the period when said rectifier was not passing current produces a voltage pulse once during each full cycle in the secondary of the transformer.

5. The combination of a transformer having a high ratio of turns between its primary and secondary windings, a switch, and a capacitor whose charging current is capable of sufficiently exciting the transformer, means connecting the primary of the transformer, the switch and the capacitor in series across a D. C. power source, the secondary of the transformer being in an output circuit and connected at one side to said power source, in which a recurring flow of current from said source recharging said capacitor produces a voltage in the output circuit consisting of a recurring voltage pulse superimposed on the voltage of said source, said output circuit voltage being obtained between the other side of said transformer secondary and the other side of said power source.

6. The combination of a transformer having a high ratio of turns between the primary and secondary, a capacitor whose charging current is capable of sufficiently exciting the transformer, and a resistor connected in parallel with said capacitor, the primary of the transformer and the capacitor being connected in series across a source of rectified A. C. power, the secondary of the transformer being in an output circuit and having one side connected to one side of the capacitor, in which recurring flow of current from said source passing through the primary of said transformer charges said capacitor by replacing the charge lost into said resistor during the period prior to the current flow, and said current flow produces a voltage in the output circuit consisting of a recurring voltage pulse in combination with a substantially unvarying voltage appearing in whole or in part across the capacitor, said output circuit voltage being obtained between the other side of said transformer secondary and a tap in the resistor.

7. The combination of a transformer having a high ratio of turns between its primary and secondary windings, a capacitor whose charging current is capable of sufficiently exciting the transformer, means connecting the primary of the transformer and the capacitor in series across a rectified A. C. power source, and the secondary of the transformer being in an output circuit, in which by sending through the primary of said transformer a current from the rectified A. C. power source for the purpose of charging the capacitor there is produced a voltage pulse in the secondary of the transformer, and means to obtain a variation in the time relationship between the generation of the pulse and some given reference time such as the occurrence of zero voltage in a phase of said rectified A. C. power source from which flows the current charging the said capacitor, said latter means consisting of a variable resistor connected in parallel with said capacitor and causing said capacitor to be discharged during the period when said current is not flowing.

References Cited in the file of this patent

UNITED STATES PATENTS

| | | |
|---|---|---|
| 1,951,614 | Kaelini et al. | Mar. 20, 1934 |
| 2,415,116 | Stiefel | Feb. 4, 1947 |
| 2,467,476 | Hallmark | Apr. 19, 1949 |